United States Patent
Bumbulis

(10) Patent No.: US 11,036,517 B2
(45) Date of Patent: Jun. 15, 2021

(54) DATABASE MANAGEMENT SYSTEM PERFORMING COLUMN OPERATIONS USING A SET OF SIMD PROCESSOR INSTRUCTIONS SELECTED BASED ON PERFORMANCE

(71) Applicant: SAP SE, Walldorf (DE)

(72) Inventor: Peter Bumbulis, Kitchener (CA)

(73) Assignee: SAP SE, Walldorf (DE)

(*) Notice: Subject to any disclaimer, the term of this patent is extended or adjusted under 35 U.S.C. 154(b) by 90 days.

(21) Appl. No.: 15/964,618

(22) Filed: Apr. 27, 2018

(65) Prior Publication Data

US 2019/0332387 A1 Oct. 31, 2019

(51) Int. Cl.
*G06F 9/38* (2018.01)
*G06F 16/22* (2019.01)
*G06F 16/25* (2019.01)
*G06F 9/30* (2018.01)

(52) U.S. Cl.
CPC ........ *G06F 9/3887* (2013.01); *G06F 9/30021* (2013.01); *G06F 9/30032* (2013.01); *G06F 9/30043* (2013.01); *G06F 16/221* (2019.01); *G06F 16/258* (2019.01)

(58) Field of Classification Search
CPC .... G06F 9/3887; G06F 16/221; G06F 16/258; G06F 9/30021; G06F 9/30043; G06F 9/30032; G06F 9/30036
USPC ..................................................... 712/17, 22
See application file for complete search history.

(56) References Cited

U.S. PATENT DOCUMENTS

| | | | |
|---|---|---|---|
| 8,843,527 B2 | 9/2014 | Diner et al. | |
| 2015/0277872 A1* | 10/2015 | Gschwind | G06F 9/45558 717/153 |
| 2017/0123775 A1* | 5/2017 | Xu | G06F 8/451 |
| 2017/0337245 A1* | 11/2017 | Beier | G06F 16/2433 |

OTHER PUBLICATIONS

Willhalm, T et al. SIMD-Scan: Ultra Fast in-Memory Table Scan using on-Chip Vector Processing Units. PVLD, vol. 2, No. 1, Aug. 2009, pp. 385-394 [online], [retrieved on Dec. 4, 2019]. Retrieved from the Internet <URL: https://dl.acm.org/citation.cfm?id=1687671> <DOI: 10.14778/1687627.1687671>.*

Intel 64 and IA-32 Architectures Software Developer's Manual vol. 1: Basic Architecture. Datasheet [online]. Intel, 2016 [retrieved on Dec. 4, 2019]. Retrieved from the Internet: <URL: https://www.intel.com/content/dam/www/public/us/en/documents/manuals/64-ia-32-architectures-software-developer-vol-1-manual.pdf>.*

Willhalm, T. et al., "Vectorizing Database col. Scans with Complex Predicates," Conference: ADMS At: Riva del Garda, Italy, vol. 2014, 12 pages, Aug. 2013.

* cited by examiner

*Primary Examiner* — Shawn Doman
(74) *Attorney, Agent, or Firm* — Sterne, Kessler, Goldstein & Fox P.L.L.C.

(57) ABSTRACT

Disclosed herein are system, method, and computer program product embodiments for performing operations on compressed index vectors in columnar in-memory database management systems. By utilizing SIMD processor instructions, database management systems may perform operations that compress and decompress bit vectors and evaluate predicates.

20 Claims, 14 Drawing Sheets

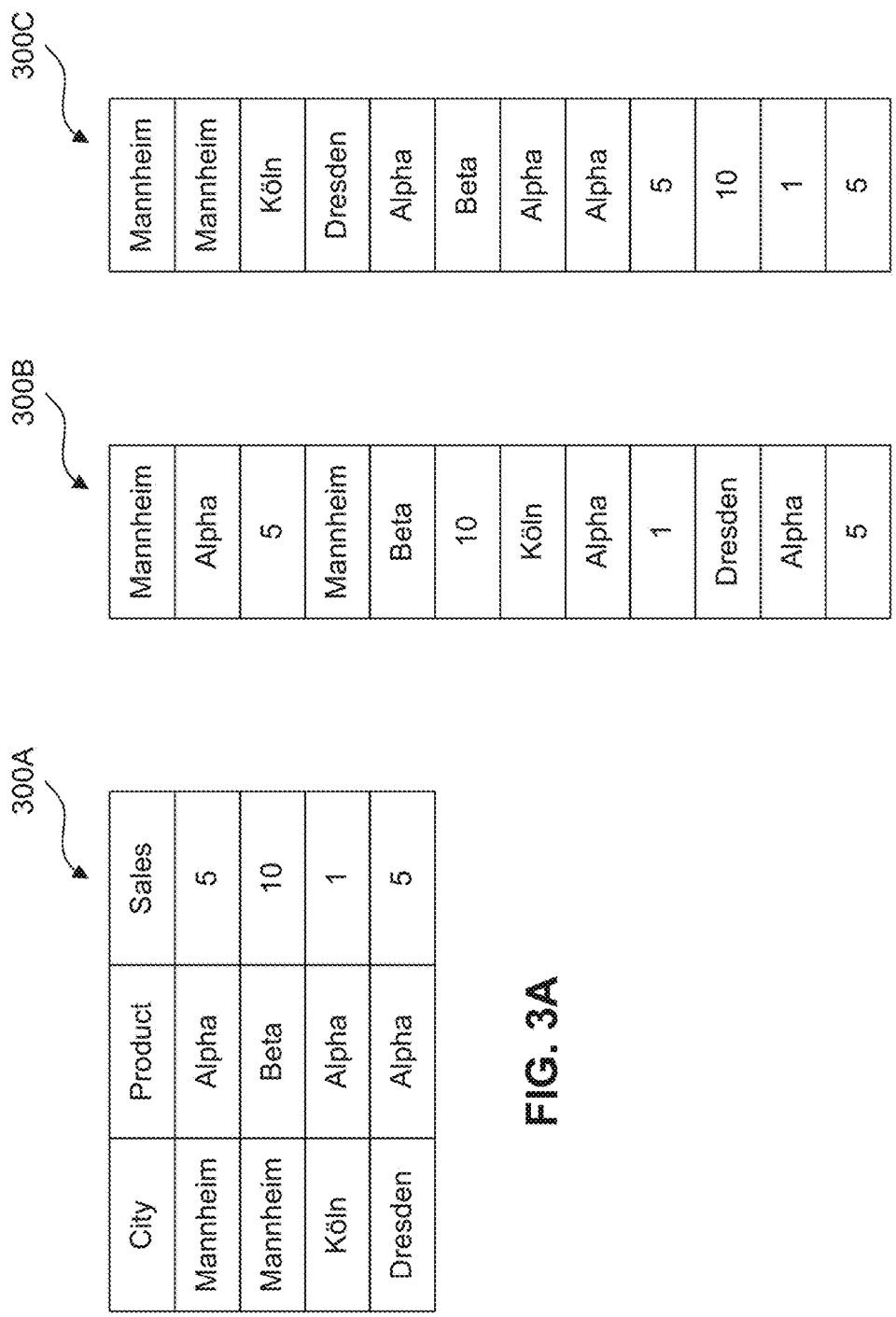

DATABASE MANAGEMENT SYSTEM PERFORMING COLUMN OPERATIONS USING A SET OF SIMD PROCESSOR INSTRUCTIONS SELECTED BASED ON PERFORMANCE

BACKGROUND

Database systems may utilize index vectors to represent columns of data. A columnar in-memory database management system (DBMS) may compress these index vectors to conserve memory usage. Compressed index vectors may require specialized operations to decompress the columnar data. Other DBMS operations may further act upon, manipulate, and utilize compressed index vectors directly. Performance, both in terms of efficiency and memory utilization is of paramount concern for these operations, given their ubiquitous use in a DBMS. These operations may utilize vector processing and single instruction, multiple data (SIMD) instructions provided by a central processing unit (CPU) to improve efficiency and harness the power of parallelization within CPUs.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

FIG. 3A is a block diagram of a database table, according to an embodiment.

FIG. 3B is a block diagram of a row-based storage of a database table, according to an embodiment.

FIG. 3C is a block diagram of a column-oriented (columnar) storage of a database table, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
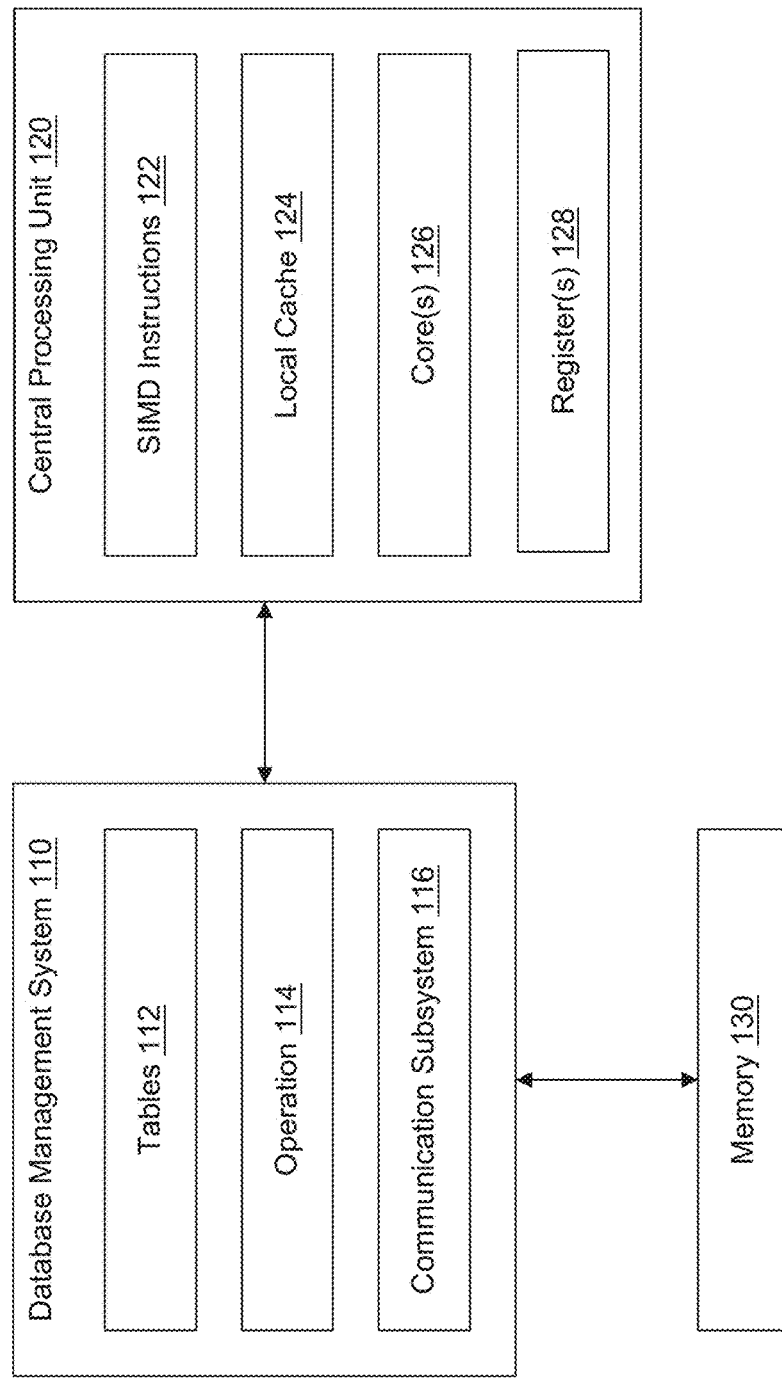
FIG. 1 illustrates an exemplary database system, according to some embodiments.

Provided herein are system, apparatus, device, method and/or computer program product embodiments, and/or combinations and sub-combinations thereof, for improving the performance of DBMS operations on compressed index vectors.

Hardware advances have given rise to modern in-memory database systems. By allowing data to persist within main memory, a DBMS may eliminate traditional performance bottlenecks found in a disk storage database, e.g., disk input/output, thereby reducing seek time and improving performance. Thus, an in-memory DBMS may be faster than a disk-storage-based database and a valuable tool for software applications where response time is critical. However, in an in-memory DBMS, memory bandwidth and access latency may emerge as the predominant performance bottlenecks.

Because memory conservation is of paramount importance in an in-memory database, a DBMS may compress data to conserve memory. While a conventional DBMS may store data tables by row, a DBMS may also be column-oriented, i.e. columnar, and store data tables by column. Columnar data storage allows efficient compression, such that more data may persist in main memory with less spatial cost. A column may store references to a dictionary using as many bits needed for fixed-length encoding of the dictionary, and column entries may reside in contiguous memory locations. In addition to saving space, compressed columnar storage may improve the performance of predicate evaluation, value comparisons, search/scan operations, and other DBMS operations.

In a columnar DBMS, index vectors may represent compressed columns of data. The use of compressed index vectors provides several benefits, e.g., an increase in the amount of data in memory and faster query processing. However, compressing the index vectors may introduce the need to decompress the data to perform a scan or retrieval. A DBMS may utilize vector-based processing, i.e. SIMD (single instruction, multiple data) instructions, to process compressed data and/or simultaneously perform operations on the data, e.g. predicate-based searches. By making optimal use of a CPU's local cache(s) and parallelization techniques, a DBMS may achieve further performance improvements over an IO-bound in-memory DBMS.

SIMD instructions provide a vector-processing model that allows instruction-level parallelism, i.e., multiple-core processors may perform the same operation on multiple data points at the same time. SIMD instructions may provide index vector manipulation operations; thus, operating on the compressed data may be possible using operations that implicitly decompress the data. Because a columnar DBMS may limit the bits used in storage to the number of bits needed to represent a dictionary, operations utilizing SIMD instructions may need to accommodate compressed index vectors of varying bit lengths.

SIMD instructions, or an extension thereto, may provide 512-bit capabilities that can operate on modern processors with 512-bit vector registers. A 512-bit SIMD extension may enable wider registers, cross-lane permutes, mask registers, and other performance enhancers. A DBMS may implement efficient operations or algorithms to take advantage of the specific capabilities of a 512-bit SIMD instruction set. Such operations may utilize a 512-bit SIMD instruction set to, for example, compress or squeeze the data, unpack a compressed index vector, and perform predicate searches on the compressed index vector.

FIG. 1 illustrates an exemplary database system 100, according to some embodiments. Database system 100 may include DBMS 110, CPU 120, and memory 130.

DBMS 110 may include tables 112, operation(s) 114, and communication subsystem 116. DBMS 110 may be an in-memory database storing compressed columnar data and utilizing vector-based processing.

Tables 112 may house data stored in a structured format in DBMS 110. DBMS 110 may store the data in tables 112 as compressed columnar data, i.e., a series of compressed index vectors, as illustrated below in reference to FIGS. 2-5. Tables 112 may store data with an associated data type, e.g., integers, decimals, strings, text, dates, monetary values, etc. An exemplary table is discussed below with reference to FIG. 3A.

Operation(s) 114 may be a collection of functionalities performed by DBMS 110 to retrieve, update, manipulate, or otherwise utilize data in tables 112. Operation(s) 114 may include selections, deletions, inserts, updates, partitioning, sorting, joining, compression, decompression, simple predicate evaluation, range predicate evaluation, in-List predicates, and a myriad of other suitable functionalities performed within DBMS 110. Operation(s) 114 may make use of SIMD instructions to perform multiple processor instructions on multiple data points on modern CPUs in parallel. Operation(s) 114 may utilize a different set of SIMD instructions (e.g., SSE2, AVX2, AVX-512, etc.) depending on the underlying hardware, i.e., the processor, in database system 100.

Communication subsystem 116 may communicate with central processing unit 120 and memory 130. Communication subsystem 116 may be any suitable communication protocol facilitating requisite communications between DBMS 110 and CPU 120 and/or memory 130. Communication subsystem 116 may include a bus, buffer, localized cache, or other suitable subsystems needed to execute SIMD instructions in CPU 120 and receive responses therefrom.

CPU 120 may be a processor or other suitable electric circuitry in a computer that executes computer program instructions. CPU 120 may support AVX-512 or other suitable 512-bit SIMD instruction set, either natively or via an extension. CPU 120 may include SIMD instructions 122, SIMD extensions 124, cores 126, and registers 128.

SIMD instructions 122 may be a single-instruction, multiple-data instruction set provided by CPU 120. SIMD instructions 122 may support 512-bit operations, either natively or via a suitable extension. SIMD instructions 122 may support functionalities including: data movement, arithmetic, comparisons, data shuffling, data unpacking, data conversion, bitwise logical operations, and a myriad of other suitable processor functions. SIMD instructions 122 may manipulate floating points, scalars, integers, vectors, and other suitable data types.

Local cache 124 may be a hardware cache used to reduce costly interactions between CPU 120 and DBMS 110 and/or memory 130. Local cache 124 may be a smaller memory in closer proximity to the core of CPU 120. Local cache 124 may include more than one different independent caches in a hierarchy of cache levels (L1, L2, L3, etc.). Local cache 124 may divide or organize caches into instruction cache, a data cache, and a translation cache.

Cores 126 may divide CPU 120 into two or more independent processing units. Each core in cores 126 may independently execute SIMD instructions 122. Cores 126 may communicate with local cache 124 via a suitable bus interface or other suitable method.

Memory 130 may be physical memory, e.g. DRAM, SRAM, EEPROM, EDO, SD-RAM, DDR-SDRAM, RD-RAM, or other form of memory suited for utilization by an in-memory database. Memory 130 may provide sufficient space to load tables 112 in memory 130 without utilizing disk-based storage. Memory 130 may be coupled with on-disk storage to maintain a hybrid system, allowing DBMS 110 to backup data, cache information, and provide data durability, avoiding the volatility of an entirely in-memory database.

Figure 2C:
FIG. 2C is a block diagram of a value ID vector, according to an embodiment.
Figure 2B:
FIG. 2B is a block diagram of a dictionary associated with a column, according to an embodiment.
Figure 2A:
FIG. 2A illustrates a block diagram of a column in a database table, according to an embodiment.

FIG. 2A is a block diagram of column 200A in a database table, according to an embodiment. Column 200A may be one of the columns in tables 112. Column 200A may store data of a particular type and/or a particular category, such as, data pertaining to first name, last name, address, zip code, to name a few examples. In a non-limiting embodiment, column 200A may include a listing of city names, as shown in FIG. 2A.

FIG. 2B is a block diagram of a dictionary 200B associated with column 200A, according to an embodiment. In dictionary 200B, each unique value in column 200A may be mapped to a unique value identifier or value ID. In an example embodiment of dictionary 200B, "Dresden" may be assigned a valued ID=0, "Köln" may be assigned a value ID=1, and "Mannheim" may be assigned a valued ID=2.

FIG. 2C is a block diagram of vector 200C providing a compressed version of column 200A, according to an embodiment. One skilled in the relevant art(s) will appreciate that vector 200C represents data in column 200A with the potential to conserve storage space. As shown in FIG. 2C, vector 200C may represent data in column 200A, but with a value ID specified in dictionary 200B substituted for each data row in column 200A. Vector 200C may include row positions and value IDs associated with each row position. For example, vector 200C includes row positions {0, 1, 2, 3, 4, 5}, and value ID's {2, 1, 0, 1, 2, 2} mapped to each row position. As shown in FIG. 2C, the value IDs represent column 200A via dictionary 200B.

FIGS. 2A-2C exemplify a compression of column 200A into dictionary 200B and vector 200C. DBMS 110 may use vector 200C to determine the rows in column 200A that store a particular value. For example, when DBMS 110 receives a query requesting all instances of "Mannheim" in column 200A, DBMS 110 may find all rows, i.e., perform a table scan, that contain "Mannheim" from vector 200C. To find all rows, first DBMS 110 finds the value ID for "Mannheim" in dictionary 200B. In the example shown in FIG. 2B, the value ID=2 corresponds to "Mannheim." Next, DBMS 110 traverses vector 200C for one or more row positions where value ID=2 and identifies rows 0, 4, and 5, which are the results of the query. The concept of compressed column data describe in FIGS. 2A-2C may be applied to column-based database storage, as discussed below in the discussion of FIGS. 3A-3C. Furthermore, a DBMS may optimize the high-level table scan approach described above through the use of vector processing and SIMD operations, as described below in FIGS. 6-9.

FIG. 3A is a block diagram of database table 300A, according to an embodiment. Database table 300A may be one of the tables in tables 112. Table 300A may store multiple types of data of a particular type and/or a particular category, such as, data pertaining to first name, last name, address, zip code, to name a few examples. In a non-limiting embodiment, column 300A may include geographically oriented sales data, i.e., a city name, a product, and the sales of that product, as shown in FIG. 3A.

FIG. 3B is a block diagram of row-based storage 300B of a database table, according to an embodiment. In row-based storage 300B, DBMS 110 stores table records in a sequence of rows, i.e., the first row exists contiguously in memory followed by the second row, the third row follows the second row, and so on. Relational databases conventionally utilize a data-storage approach like that evidenced by row-based storage 300B.

FIG. 3C is a block diagram of columnar storage 300C of a database table, according to an embodiment. Columnar storage 300C illustrates a column-based approach to storing data in tables 112. In a column-based approach, the entries of a column exist in contiguous memory locations. A column-based approach may present performance advantages over a row-based approach including faster data access, better compression, and enhanced parallel processing. However, a column-based approach may be less efficient when an application frequently updates single records, performs insertions, or selects many instances of an entire row.

Figure 4B:
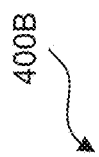
FIGS. 4A-B illustrate compression of a column-oriented storage of a database table, according to some embodiments.
Figure 4A:

FIG. 4A-B illustrate a compressed form of columnar storage 300C including a columnar dictionary 400A and index vector 400B, according to some embodiments. Columnar dictionary 400A and index vector 400B may realize significant spatial cost savings over columnar storage 300C while storing the same information. Furthermore, DBMS 110 may only store index vector 400B using the max number of bits needed. For example, index vector 400B may be stored using only 3 bits because the maximum integer in the index vector is 7. If 8 were the maximum integer in index vector 400B, then 4 bits may be needed to storage all the entries in columnar dictionary 400A.

Figure 5:
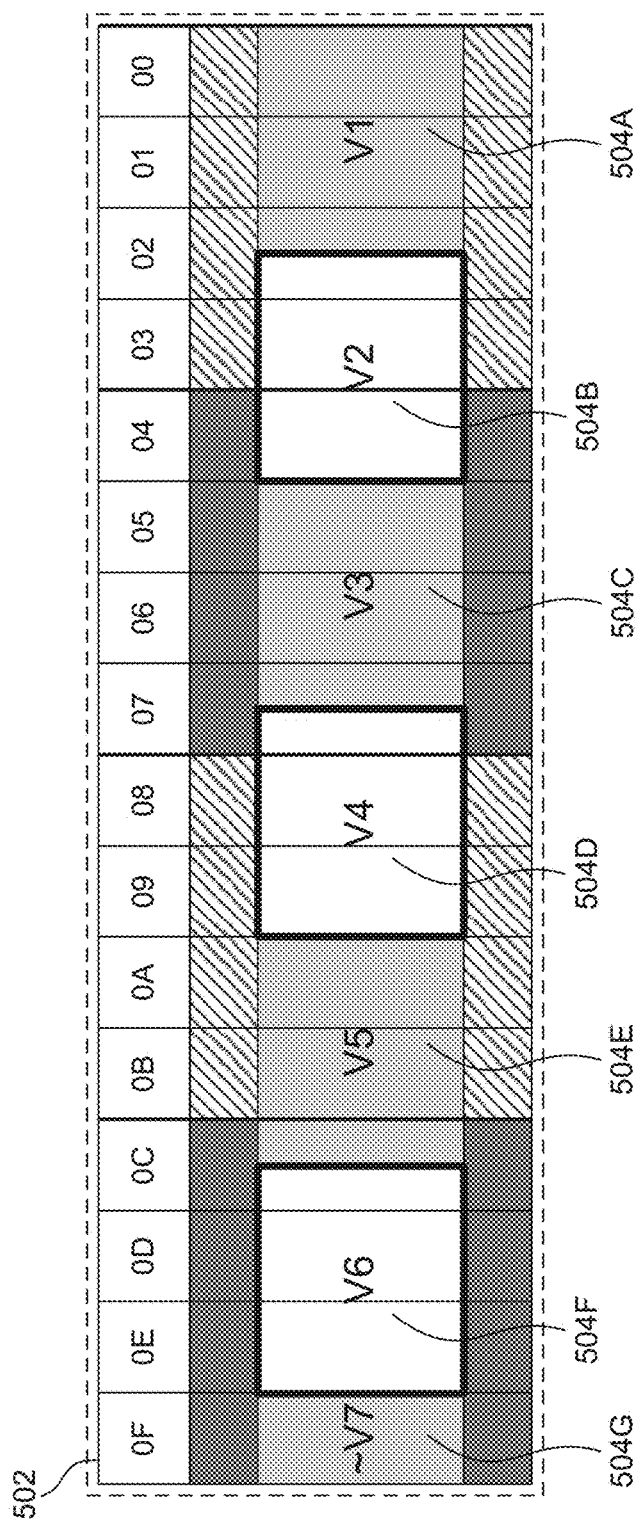
FIG. 5 is a block diagram of a series of bytes storing compressed columnar database table values as index vectors, according to some embodiments.

FIG. 5 is a block diagram of series of bytes storing compressed columnar database table values as index vectors, according to some embodiments. Bytes 502 may be a number of contiguous bits in memory. Bytes 502 may be 16-bit, 32-bit, 64-bit, 128-bit or other appropriate bit length. Vectors 504 may be a representation of compressed index vector 400B in memory.

As FIG. 5 illustrates, because vectors 504, i.e., compressed columns, may be stored using the lowest possible number of bits, the boundaries of the compressed index vectors may not correspond to the boundaries created in bytes 502. Accordingly, any operation utilizing the compressed data may need to perform a shuffle/align method in order to decompress and process vectors 504. Such an algorithm is described in further detail below with reference to FIGS. 7-9.

FIGS. 6A-6E are example graphs illustrating performance improvements of updated DBMS vector operations across 32 bit lengths, according to some embodiments. In FIGS. 6A-6E, the horizontal axis represents the bit case, i.e., the number of bits determined to be needed to store index vector 400B based on the entries in columnar dictionary 400A. In FIGS. 6A-6E, the vertical axis represents a time taken in nanoseconds per symbol. In FIGS. 6A-6E, the darker-shaded bars represent the performance of the operation using a non-512-bit instruction set while the lighter-shaded bars represent the performance of the operation using a 512-bit operation set.

Figure 6A:
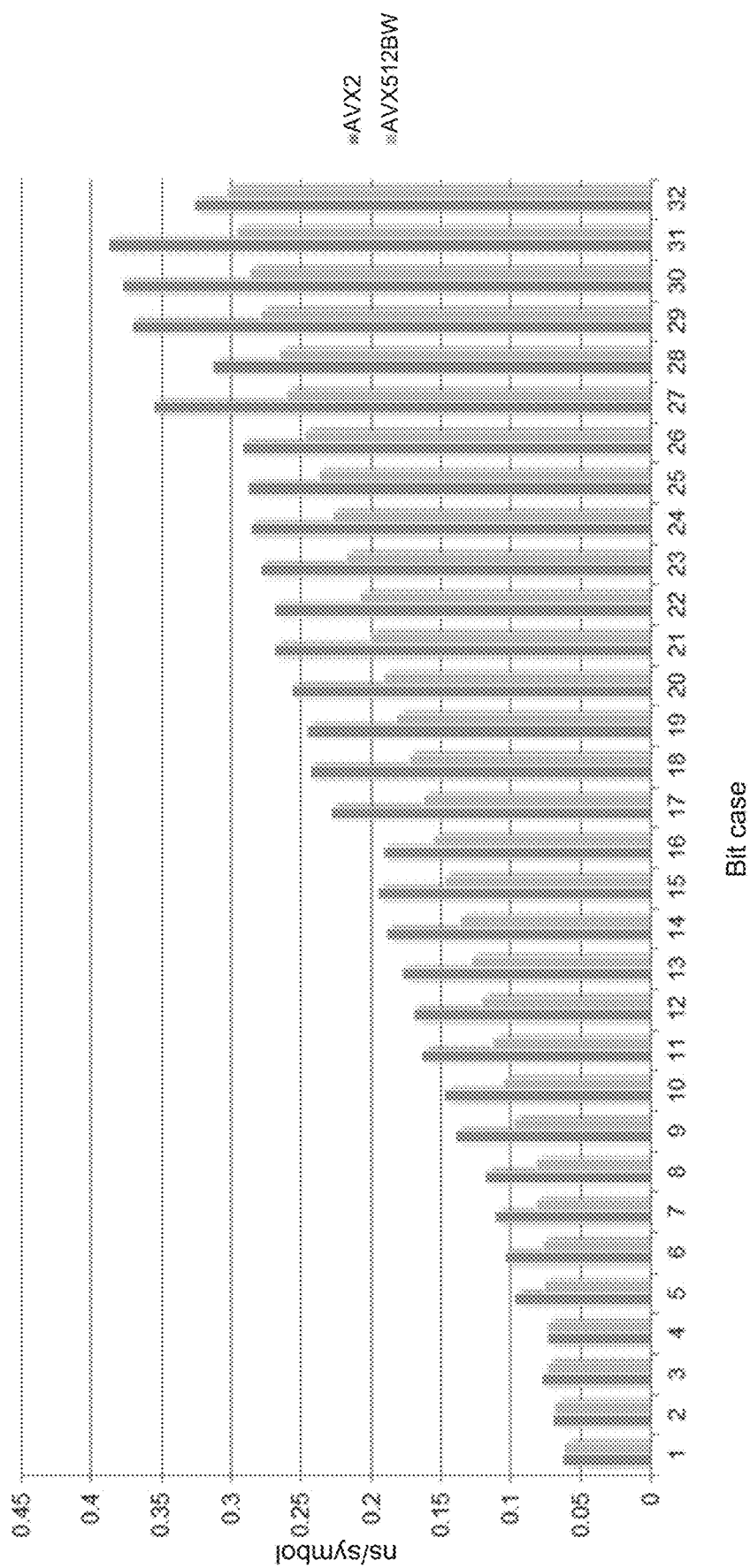
FIGS. 6A-6E are example graphs illustrating performance improvements of updated DBMS vector operations across 32 bit lengths, according to some embodiments.

FIG. 6A illustrates the performance of an operation that unpacks a compressed bit vector, such as that described below with reference to FIG. 8. Such a function may be named "mgeti_AVX512."

Figure 6B:
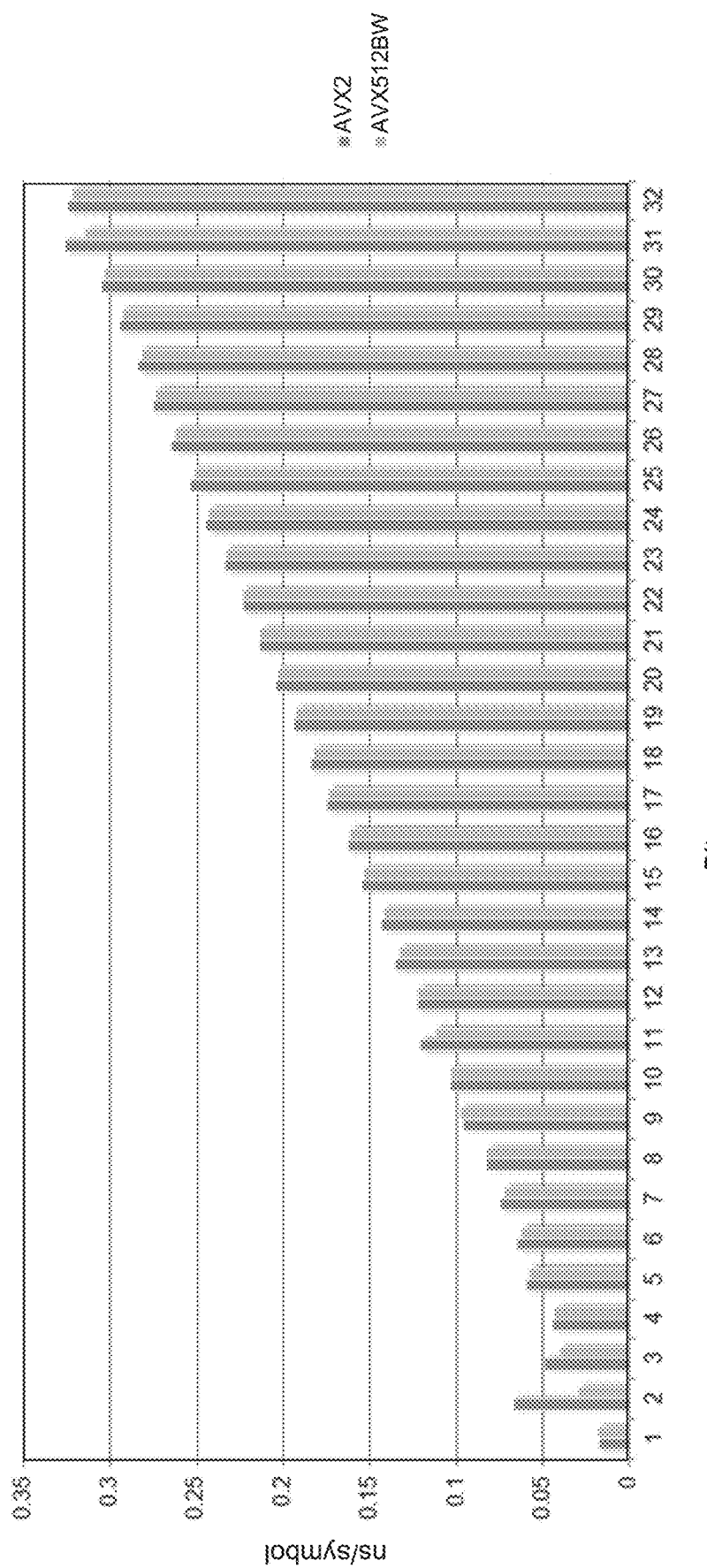

FIG. 6B illustrates the performance of an operation that performs a predicate search and returns a bit vector of the results. Such a function may be named "mgetSearch_AVX512_bitVector."

Figure 6C:
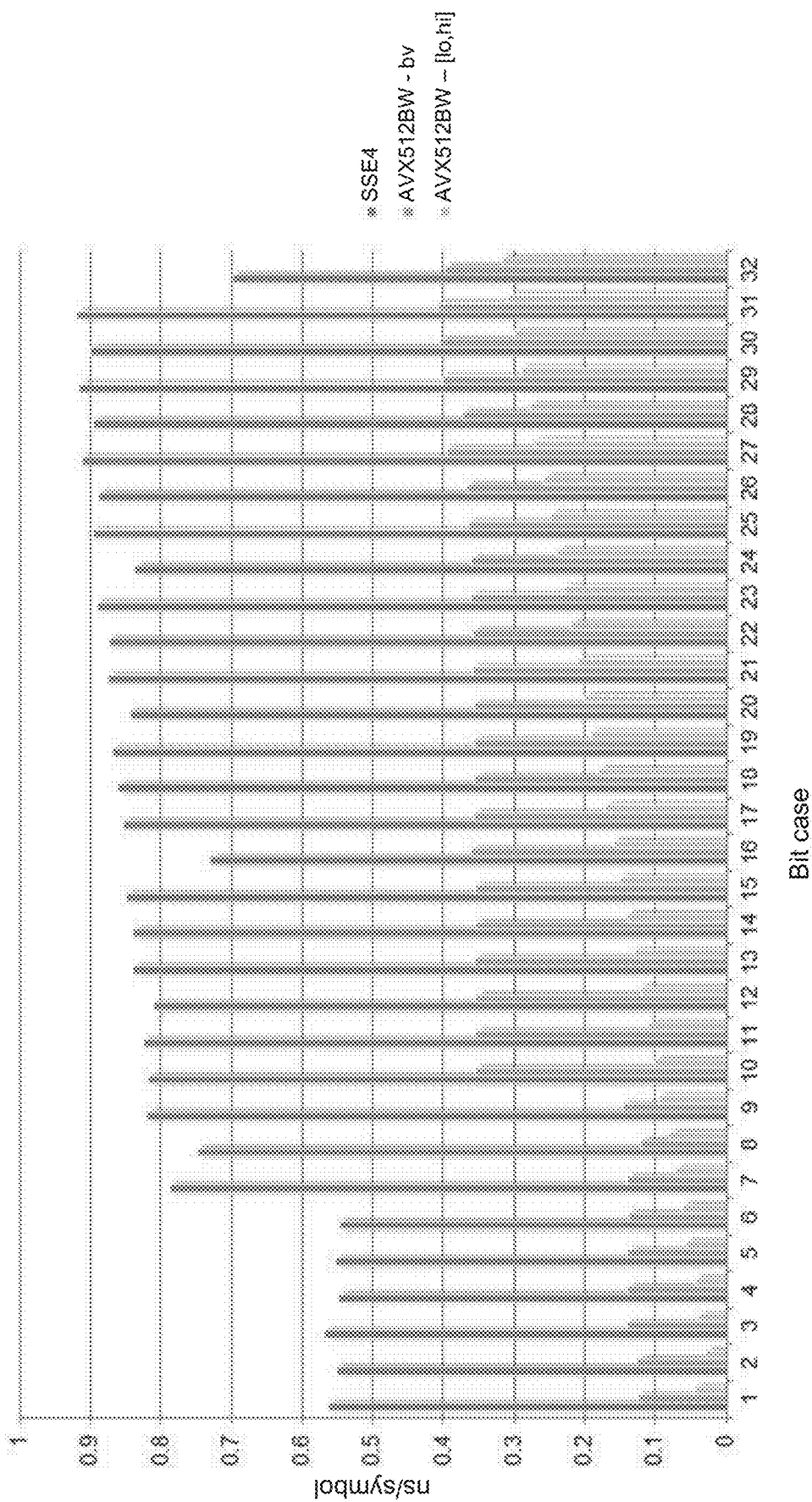

FIG. 6C illustrates the performance of an operation that performs a predicate search and returns a bit vector of the results. Such a function may be named "mgetSearchBv_AVX512_ResBv."

Figure 6D:
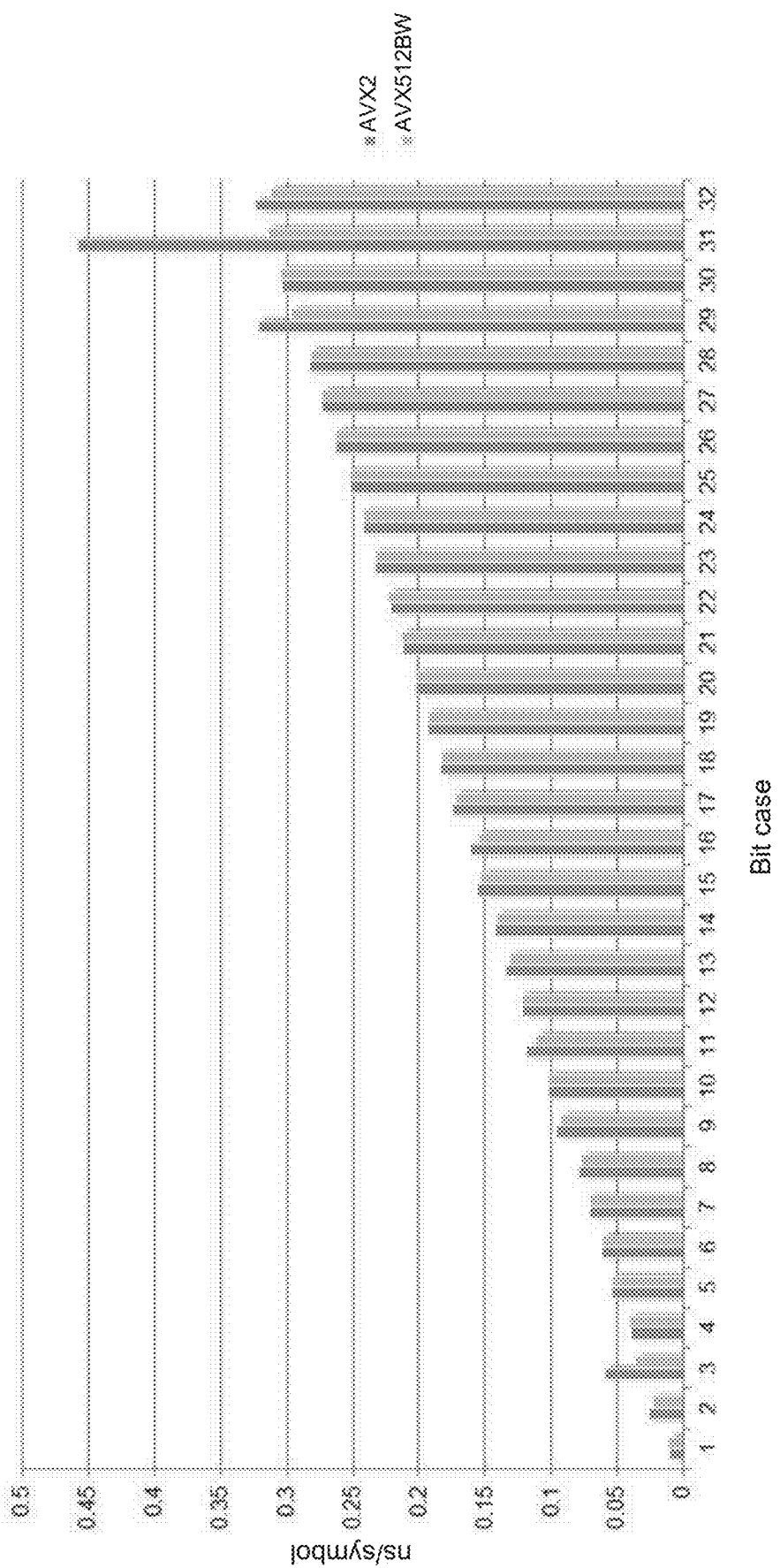

FIG. 6D illustrates the performance of an operation that performs a predicate search and returns a bit vector of the results. Such a function may be named "mgetSearchi_AVX512."

Figure 6E:
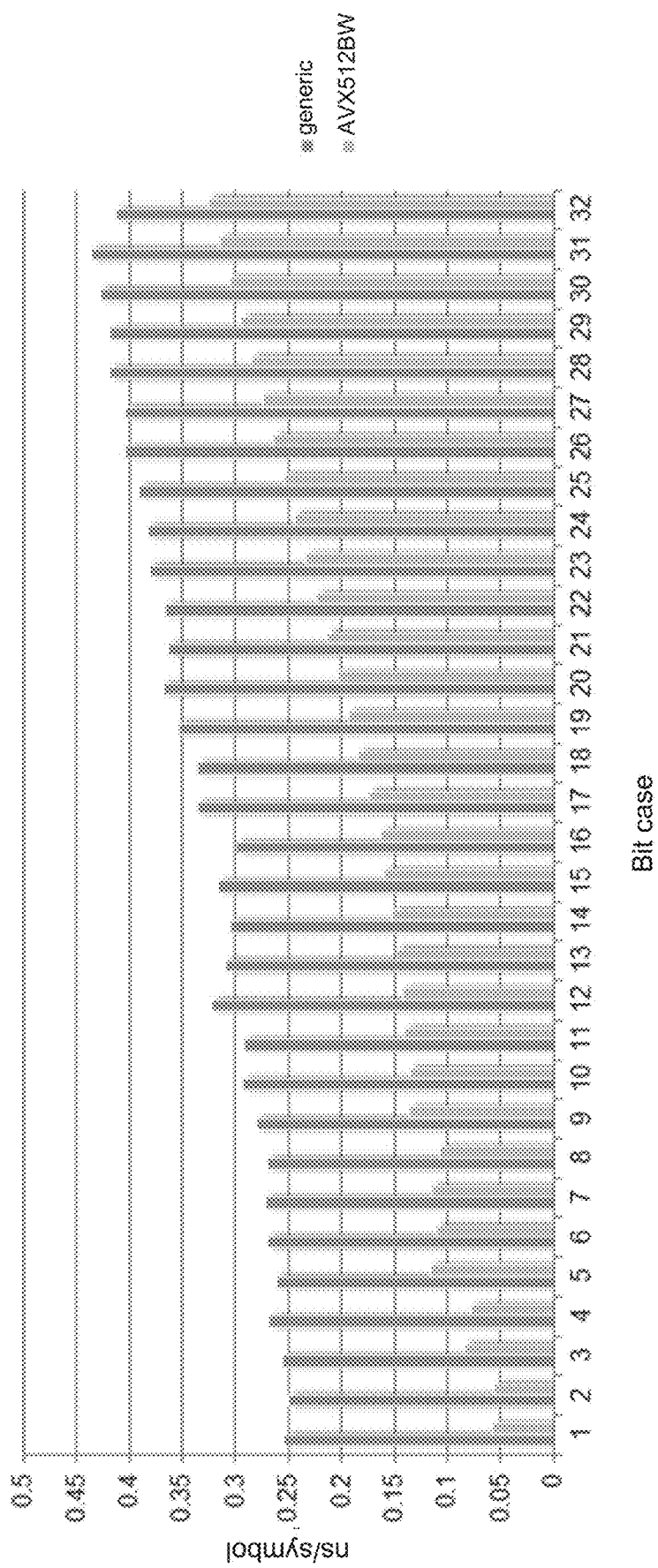

FIG. 6E illustrates the performance of an operation that compresses a bit vector. Such a function may be named "mseti_AVX512."

Figure 7:
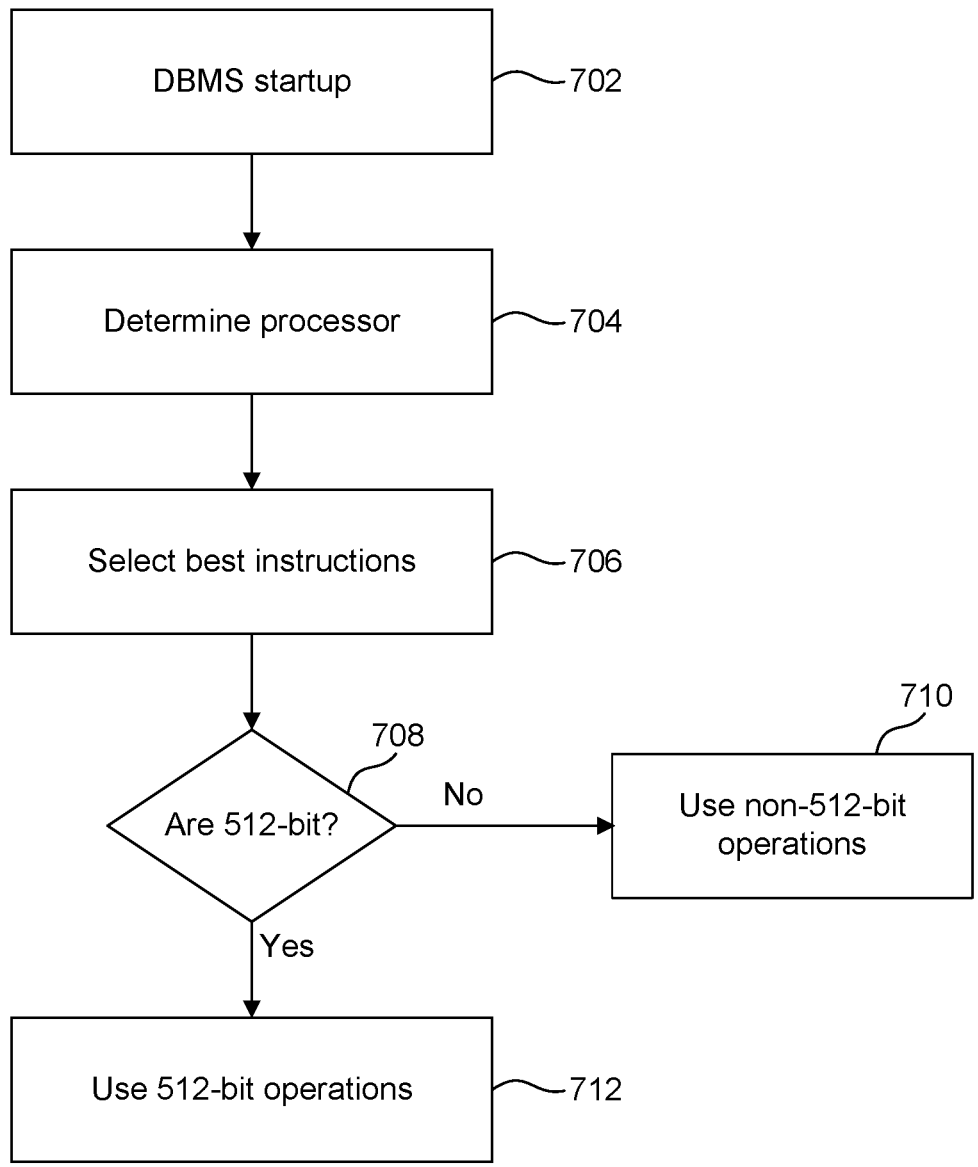
FIG. 7 illustrates a flowchart describing a method of determining whether 512-bit vector processing operations may be utilized by a DBMS, according to some embodiments.

FIG. 7 illustrates a method 700 for determining whether a 512-bit set of vector processing operations may be utilized by a DBMS, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 702, DBMS 110 may initialize. DBMS 110 may be a stand-alone, in-memory database. DBMS 110 may be an in-memory instance of an otherwise disk-based database. DBMS 110 may launch at the start of an associated application or may launch as its own stand-alone database management tool. DBMS 110 may start upon startup of a computer, i.e., when the power of a physical machine turns on.

In 704, DBMS 110 determines the processor running in its host computer. DBMS 110 may accomplish this through an appropriate stored procedure, module, library or other appropriate method. DBMS 110 may also retrieve a list of processor instructions provided by the available processor. One skilled in the relevant art(s) will appreciate that a given processor may provide more than one set or subset of processor instructions to choose from. For example, a processor may provide subsets of processor instructions including: Fundamental instruction set (AVX512-F); Conflict Detection instruction set (AVX512-CD); Exponential and Reciprocal instruction set (AVX512-ER); and Prefetch instruction set (AVX512-PF).

In 706, DBMS 110 selects the processor instructions that best optimize the performance of DBMS 110. DBMS 110 may select the instructions based on a configured list of processors and performances stored in DBMS 110. Other factors, such as the register size, number of cores, operating system, associated hardware, etc. may be utilized by DBMS 110 to determine the appropriate processor instructions to select.

In 708, DMBS 110 determines if the processor instructions selected provide 512-bit extensions or 512-bit native instructions. If the processor instructions do not provide 512-bit SIMD vector processing, then method 700 proceeds to 710 and utilizes a set of non-512-bit operations. If the processor instructions do provide 512-bit SIMD vector processing, then method 700 proceeds to 712.

In 712, DBMS 110 sets an internal flag noting that DBMS 110 may employ operations leveraging 512-bit SIMD instructions. DBMS 110 may run 512-bit SIMD instructions within operations 114 to compress index vectors and decompress or otherwise manipulate compressed index vectors. This disclosure describes these operations in further detail below with reference to FIGS. 8-9.

Figure 8:
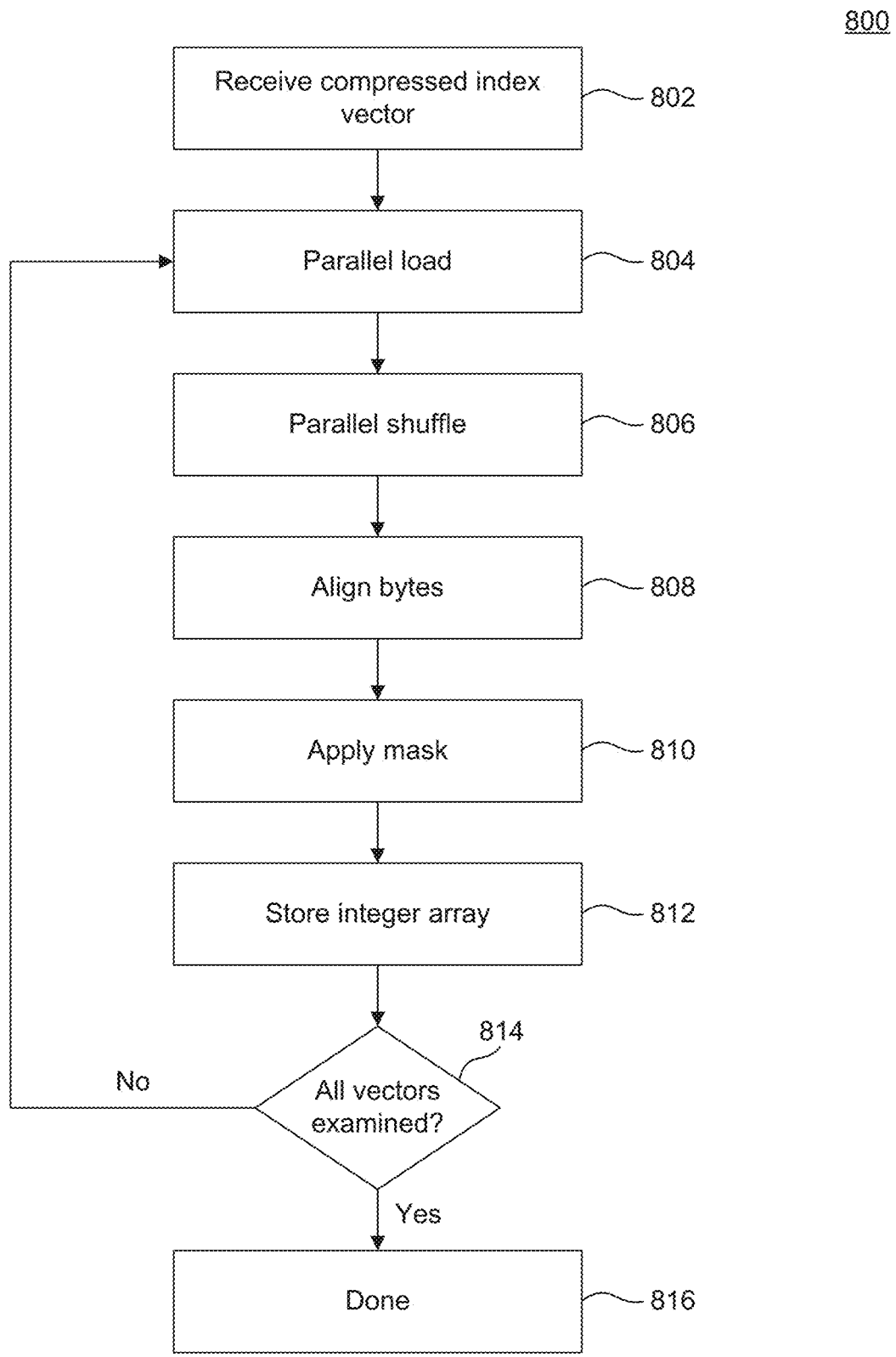
FIG. 8 illustrates a flowchart describing a method of de-compressing an index vector utilizing 512-bit processor operations, according to some embodiments.

FIG. 8 illustrates a method 800 for de-compressing an index vector utilizing 512-bit SIMD processor operations. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art(s).

Method 800 commences when DBMS 110 runs a de-compression operation from among operation(s) 114 against a compressed bit vector such as index vector 400B in order to formulate an array of integers that may be further manipulated or utilized. Method 800 may return uncompressed data as an array of integers or any other suitable output.

In 802, DBMS 110 receives a compressed bit vector. The compressed bit vector may reflect a column of columnar data in DBSM 110, for example index vector 400B. Index vector 400B in the compressed bit vector may have a bit length between 1 and 32, depending on the data (perhaps the number of distinct values in the dictionary) stored in columnar dictionary 400A. In other embodiments, index vector 400B may have higher bit lengths than 32. The size of the compressed bit vector received may vary according to the nature, size, characteristics, and other suitable properties of the underlying table.

In 804, DBMS 110 may perform a parallel load utilizing a 512-bit SIMD instruction. The parallel load will retrieve a number of vectors, for example 2, 4, 8, 16, or 32. The number of vectors retrieved may vary depending on the bit case, hardware characteristics, properties of the bit vector, and other suitable characteristics. Because the 512-bit SIMD instructions utilize vector parallelization, the vectors may be retrieved simultaneously across cores or threads of CPU 120 and acted upon in unison.

In 806, DBMS 110 may perform a parallel shuffle of the retrieved data utilizing a 512-bit SIMD instruction. The result of the shuffling stores one vector 504 into one standardized byte space. There may be a one to one relationship between the vectors and the bytes at this point; in other words, each vector will be stored in one byte. The byte space required may vary based on the bit case. The parallel shuffle instructions may also execute in parallel across the CPU 120's cores.

In 808, DBMS 110 may run a parallel shift utilizing a 512-bit SIMD instruction to align each vector 504 in the byte space. The alignment may be necessary because, although the shuffle in 806 created a one-to-one relationship between vectors and bytes, the compressed vectors may not necessarily align with the byte boundaries. The parallel shift instructions may also execute in parallel across the CPU 120's cores.

In 810, DBMS 110 may run a parallel bitmask utilizing a 512-bit SIMD instruction in order to limit the information in index vector 400B to the appropriate bit length. After running the bit mask, only bits that had information loaded, shuffled, and aligned may contain information. The parallel bitmask may execute in parallel.

In 812, DBMS 110 may run a parallel store utilizing a 512-bit SIMD instruction in order to store the decompressed information in an integer array. The integer array may expand with each iteration of steps 804 through 814. The parallel store may execute in parallel.

In 814, DBMS 110 determines if all vectors have been examined in the compressed index vector. If method 800 examined all vectors in the compressed index vector retrieved in 802, then the de-compression of method is 800 and DBMS returns the decompressed integer array. If DBMS 110 did not completely examine the compressed index vector retrieved in 802 in its entirety, then method 800 returns to 804 to begin another iteration, i.e., load in parallel another set of bit vectors.

In 816, method 800 completes. DBMS 110 may return the decompressed integer array, i.e., the uncompressed data in the form of an array fixed bit-length integers for further downstream manipulation or utilization. DBMS 110 may run subsequent operations against the decompressed integer array, return appropriate results to a console, or perform other suitable actions.

Figure 9:
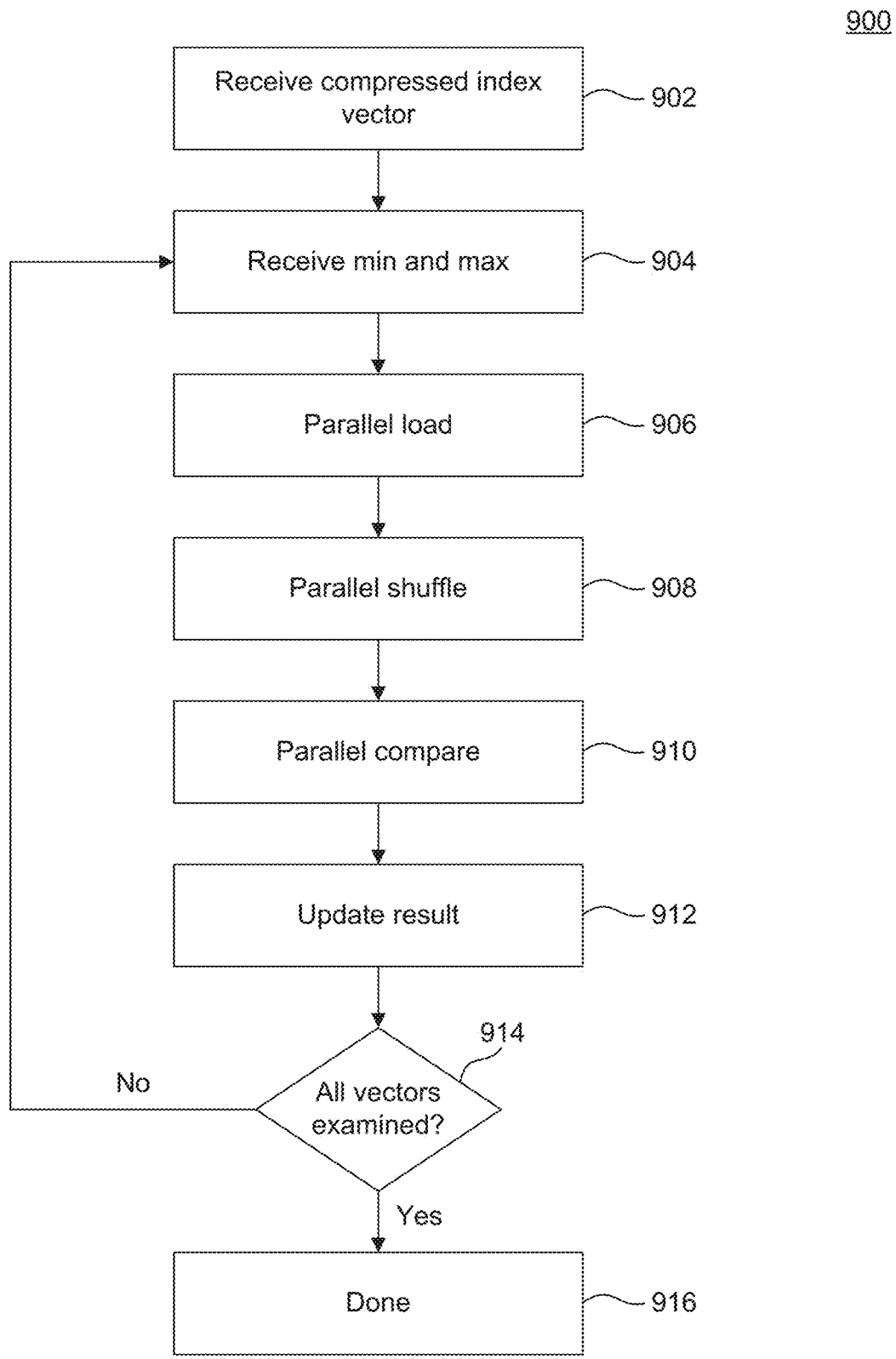
FIG. 9 illustrates a flowchart describing a method of de-compressing an index vector and performing a predicate search utilizing 512-bit processor operations, according to some embodiments.

FIG. 9 illustrates a method 900 for de-compressing an index vector and performing a predicate search utilizing 512-bit processor operations, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art(s).

Method 900 commences when DBMS 110 performs a predicate search on a compressed bit vector such as index vector 400B. By combining a decompression and filtering, enhanced performance may be achieved over an operation that performs the decompression and filtering as separate steps. Method 900 may return an array of integers, a bit vector, or any other suitable output. Method 900 may perform the filtering, i.e., filtering, using a simple predicate (e.g., =, < >, >=, <, <=, IS NULL, etc.), a range predicate (e.g., BETWEEN, etc.), or an In-List predicate (IN, etc.).

In 902, DBMS 110 receives a compressed bit vector. The compressed bit vector may reflect a column of columnar data in DBSM 110, for example index vector 400B. Index vector 400B in the compressed bit vector may have a bit length between 1 and 32, depending on the data (e.g., the number of distinct values) in columnar dictionary 400A. In other embodiments, index vector 400B may have higher bit lengths than 32. The size of the compressed index vector received may vary according to the nature, size, characteristics, and other suitable properties of the underlying table.

In 904, DBMS 110 may receive a suitable predicate variable or variables for the purposes of predicate evaluation. DBMS 110 may receive a min and a max, a text string, or other suitable predicate. A min and the max or other suitable predicate value may be any appropriate data type for use in evaluating the predicate. DBMS 110 may load the min and max into a sequence of bytes for use in later comparisons.

In 906, DBMS 110 may perform a parallel load utilizing a 512-bit SIMD instruction. The parallel load will retrieve a number of vectors, for example 2, 4, 8, 16, or 32. The number of vectors retrieved may vary depending on the bit case, hardware characteristics, properties of the bit vector, and other suitable characteristics. Because the 512-bit SIMD instructions utilize vector parallelization, the vectors may be retrieved simultaneously across cores or threads of CPU 120 in unison.

In 908, DBMS 110 may perform a parallel shuffle of the retrieved data utilizing a 512-bit SIMD instruction. The result of the shuffling stores one vector 504 into one standardized byte space, e.g. 32-bits. There may be a one to one relationship between the vectors and the bytes at this point; in other words, each vector will be stored in one byte. The byte space required may vary based on the bit case, the underlying hardware, or other suitable factors. The parallel shuffle instructions may also execute in parallel across the CPU 120's cores.

In 910, DBMS 110 may perform a parallel compare utilizing a 512-bit SIMD instruction. The parallel compare may perform a suitable predicate evaluation against the vectors stored in the byte spaces. Because the 512-bit SIMD instructions utilize vector parallelization, the vectors may be compared simultaneously across cores or threads of CPU 120 in unison. The parallel compare instructions may also execute in parallel across the CPU 120's cores.

In 912, DBMS 110 updates the stored result. DBMS 110 may run a parallel store in order to store the information in an integer array. DBMS 110 may store the results as an integer vector or as a bit vector where bits set to 1 are hits and the bit position corresponds to the index position in the compressed bit vector that matched the predicate, i.e. fell within a min and max, matched a simple predicate, or matched an inList function.

In 914, DBMS 110 determines if all vectors have been examined in the compressed index vector. If method 900 examined all vectors in the compressed index vector retrieved in 902, then the de-compression of method is 900 and DBMS returns the decompressed integer array. If DBMS 110 did not completely examine the compressed index vector retrieved in 902 in its entirety, then method 900 returns to 904 to begin another iteration.

In 916, method 900 completes, and DBMS 110 returns an appropriate result. The result may be uncompressed data in the form of an array fixed bit-length integers for further downstream manipulation or utilization. The result may also be a bit vector where a hit on that bit position for the predicate evaluation is set to 1, as described above in 912.

Figure 10:
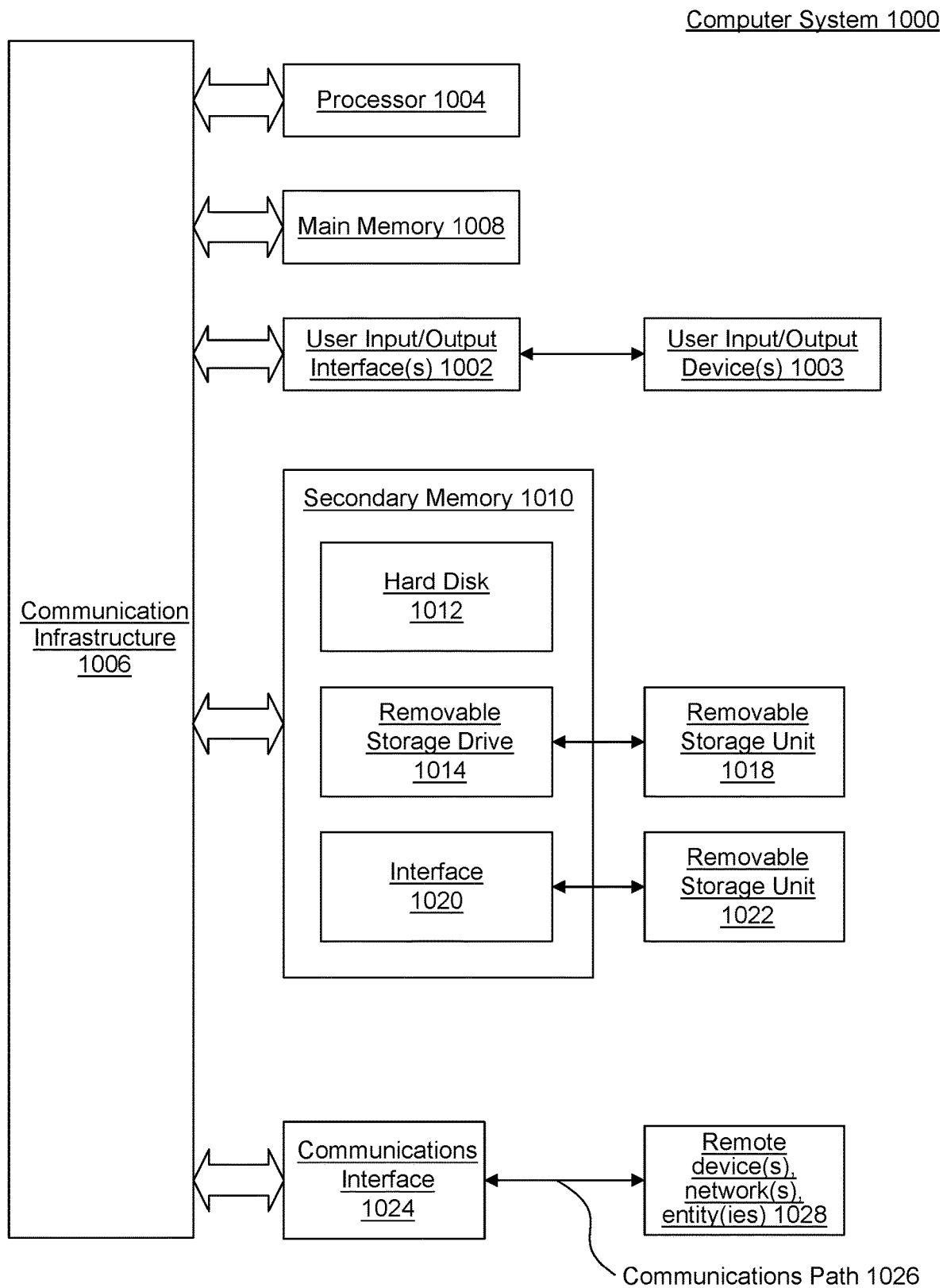
FIG. 10 is an example computer system useful for implementing various embodiments.

FIG. 10 is an example computer system useful for implementing various embodiments. Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1008, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
   a memory;
   one or more processors coupled to the memory configured to provide processor instructions, wherein the processor instructions use a register; and
   a database management system configured to:
   upon startup, retrieve a list of sets of processor instructions provided by the one or more processors and a list of performances for each of the processor instructions, wherein the list of performances correlates a processor and an instruction to a performance level, and select from the list of sets of processor instructions, a set of single instruction, multiple data (SIMD) instructions comprising a parallel-load instruction, a parallel-shuffle instruction, a parallel-shift instruction, and a parallel-compare instruction, wherein the database management system determines the set of SIMD instructions from the list of sets of processor instructions that optimize the performance of the database management system based on a size of the register, a number of cores, an operating system, and the list of performances; and
   evaluate a predicate by:
   loading a quantity of fixed-bit-length integers from a compressed index vector of fixed-bit-length integers that represents a columnar database table into the register via the parallel-load instruction;
   shuffling the quantity of the fixed-bit-length integers in the register via the parallel-shuffle instruction such that each fixed-bit-length integer in the quantity of fixed-bit-length integers occupies a fixed-length byte in the register;
   aligning the quantity of the fixed-bit-length integers and the fixed-length byte via the parallel-shift instruction such that a boundary of each fixed-bit-length integer matches a fixed-length byte boundary in the register; and
   evaluating the quantity of the fixed-bit-length integers against the predicate using the parallel-compare instruction against the register to determine a matching result set.

2. The system of claim 1, wherein the register is a 512-bit register.

3. The system of claim 1, wherein the database management system is an in-memory database management system.

4. A method, comprising:
  determining, by a database management system, one or more processors running in a host computer upon startup;
  retrieving, by the database management system, a list of sets of processor instructions provided by the one or more processors and a list of performances for each of the sets of processor instructions, wherein the sets of processor instructions use a register, and wherein the list of performances correlates processors and the sets of processor instructions to a performance level;
  selecting, by the database management system, from the list of sets of processor instructions a set of single instruction, multiple data (SIMD) instructions comprising a parallel-load instruction, a parallel-shuffle instruction, a parallel-shift instruction, and a parallel-compare instruction, wherein the database management system determines the set of SIMD instructions from the list of sets of processor instructions that optimize the performance of the database management system based on a size of the register, a number of cores, an operating system, and the list of performances; and
  evaluating, by the database management system, a predicate by:
    loading a quantity of fixed-bit-length integers from a compressed index vector of fixed-bit-length integers that represents a columnar database table into the register via the parallel-load instruction;
    shuffling the quantity of the fixed-bit-length integers in the register via the parallel-shuffle instruction such that each fixed-bit-length integer in the quantity of fixed-bit-length integers occupies a fixed-length byte in the register;
    aligning the quantity of the fixed-bit-length integers and the fixed-length byte via the parallel-shift instruction such that a boundary of each fixed-bit-length integer matches a fixed-length byte boundary in the register; and
    evaluating the quantity of the fixed-bit-length integers against the predicate using the parallel-compare instruction against the register to determine a matching result set.

5. The method of claim 4, wherein the register is a 512-bit register.

6. The method of claim 4, wherein the database management system stores the matching result set in an integer array.

7. The method of claim 4, wherein the database management system stores the matching result set in a bit vector.

8. The method of claim 4, wherein the predicate is a simple predicate utilizing one of the operators: equals, not equals, greater than, greater than or equal to, less than, less than or equal to, between, like, is null, or is not null.

9. The method of claim 4, wherein the predicate is a range predicate comprising a min and a max.

10. The method of claim 4, wherein the predicate is expressed as a bit set.

11. The method of claim 4, wherein the predicate is an in-list predicate comprising a target list.

12. The method of claim 4, wherein the database management system is an in-memory database management system.

13. A non-transitory computer-readable device having instructions stored thereon that, when executed by at least one computing device, causes the at least one computing device to perform operations comprising:
  determining one or more processors running in the at least one computing device upon startup;
  retrieving a list of sets of processor instructions provided by the one or more processors and a list of performances for each of the sets of processor instructions, wherein the sets of processor instructions use a register, and wherein the list of performances correlates processors and the sets of processor instructions to a performance level;
  selecting from the list of sets of processor instruction a set of single instruction, multiple data (SIMD) instructions comprising a parallel-load instruction, a parallel-shuffle instruction, a parallel-shift instruction, and a parallel-compare instruction, wherein the selected set of SIMD instructions optimizes the performance of a database management system based on a size of the register, a number of cores, an operating system, and the list of performances; and
  evaluating a predicate in the database management system by:
    loading a quantity of fixed-bit-length integers from a compressed index vector of fixed-bit-length integers that represents a columnar database table into the register via the parallel-load instruction;
    shuffling the quantity of the fixed-bit-length integers in the register via the parallel-shuffle instruction such that each fixed-bit-length integer in the quantity of fixed-bit-length integers occupies a fixed-length byte in the register;
    aligning the quantity of the fixed-bit-length integers and the fixed-length byte via the parallel-shift instruction such that a boundary of each fixed-bit-length integer matches a fixed-length byte boundary in the register; and
    evaluating the quantity of the fixed-bit-length integers against the predicate using the parallel-compare instruction against the register to determine a matching result set.

14. The non-transitory computer-readable device of claim 13, wherein the register is a 512-bit register.

15. The non-transitory computer-readable device of claim 13, wherein the database management system is an in-memory database management system.

16. The non-transitory computer-readable device of claim 13, wherein the predicate is a simple predicate utilizing one of the operators: equals, not equals, greater than, greater than or equal to, less than, less than or equal to, between, like, is null, or is not null.

17. The system of claim 1, wherein the database management system stores the matching result set in an integer array.

18. The system of claim 1, wherein the database management system stores the matching result set in a bit vector.

19. The system of claim 1, wherein the predicate is a simple predicate utilizing one of the operators: equals, not equals, greater than, greater than or equal to, less than, less than or equal to, between, like, is null, or is not null.

20. The system of claim 1, wherein the predicate is a range predicate comprising a min and a max.

* * * * *